United States Patent
Blomgren et al.

(10) Patent No.: US 9,307,497 B2
(45) Date of Patent: Apr. 5, 2016

(54) METHODS AND DEVICES FOR SETTING ROT LIMIT

(75) Inventors: Mats Blomgren, Stockholm (SE); Fredrik Gunnarsson, Linköping (SE); Joakim Nilsson, Stockholm (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 85 days.

(21) Appl. No.: 14/124,038

(22) PCT Filed: Jun. 7, 2011

(86) PCT No.: PCT/SE2011/050693
§ 371 (c)(1),
(2), (4) Date: Dec. 5, 2013

(87) PCT Pub. No.: WO2012/169942
PCT Pub. Date: Dec. 13, 2012

(65) Prior Publication Data
US 2014/0128056 A1 May 8, 2014

(51) Int. Cl.
*H04W 52/18* (2009.01)
*H04W 52/36* (2009.01)
*H04B 17/345* (2015.01)

(52) U.S. Cl.
CPC ............ *H04W 52/18* (2013.01); *H04B 17/345* (2015.01); *H04W 52/365* (2013.01)

(58) Field of Classification Search
CPC ... H04B 17/345; H04W 52/18; H04W 52/365
USPC .............. 455/422.1, 522, 63.1, 501, 442; 370/342, 329
See application file for complete search history.

(56) References Cited

U.S. PATENT DOCUMENTS

| | | | |
|---|---|---|---|
| 2004/0258035 A1* | 12/2004 | Fan et al. | 370/342 |
| 2006/0068717 A1 | 3/2006 | Gandhi et al. | |
| 2007/0077938 A1 | 4/2007 | Bi et al. | |
| 2007/0281695 A1* | 12/2007 | Lohr et al. | 455/436 |
| 2008/0004031 A1* | 1/2008 | Rong et al. | 455/452.1 |
| 2008/0279121 A1 | 11/2008 | Englund et al. | |
| 2009/0207746 A1 | 8/2009 | Yuan et al. | |
| 2010/0304778 A1* | 12/2010 | Goia et al. | 455/522 |
| 2011/0319088 A1* | 12/2011 | Zhou et al. | 455/442 |

OTHER PUBLICATIONS

Unknown, Author. "3rd Generation Partnership Project; Technical Specification Group Radio Access Network; Radio Resource Control (RRC); Protocol Specification (Release 1999)." 3GPP TS 25.331 V3.12.0. Sep. 2002.

*Primary Examiner* — Nathan Taylor
(74) *Attorney, Agent, or Firm* — Patents on Demand, P.A.; Brian K. Buchheit; Scott M. Garrett (57) ABSTRACT

Methods and devices to dynamically determine suitable cell-specific RoT limits are provided. The suitable cell-specific RoT limits can advantageously be set both with respect to a short time scale and a long time scale In accordance with some embodiments the long term time scale operation is based on UE measurements representative for the intended coverage area of the cell. In accordance with some embodiments the short term time scale operation is based on UE measurements from active User Equipments only. Furthermore, also receiver capabilities of and cell isolation to neighboring base stations can be considered in the long time scale operation.

15 Claims, 5 Drawing Sheets

METHODS AND DEVICES FOR SETTING ROT LIMIT

TECHNICAL FIELD

The present invention relates to methods and devices for setting of a Raise over Thermal (RoT) limit in a cellular radio system.

BACKGROUND

Figure 1:
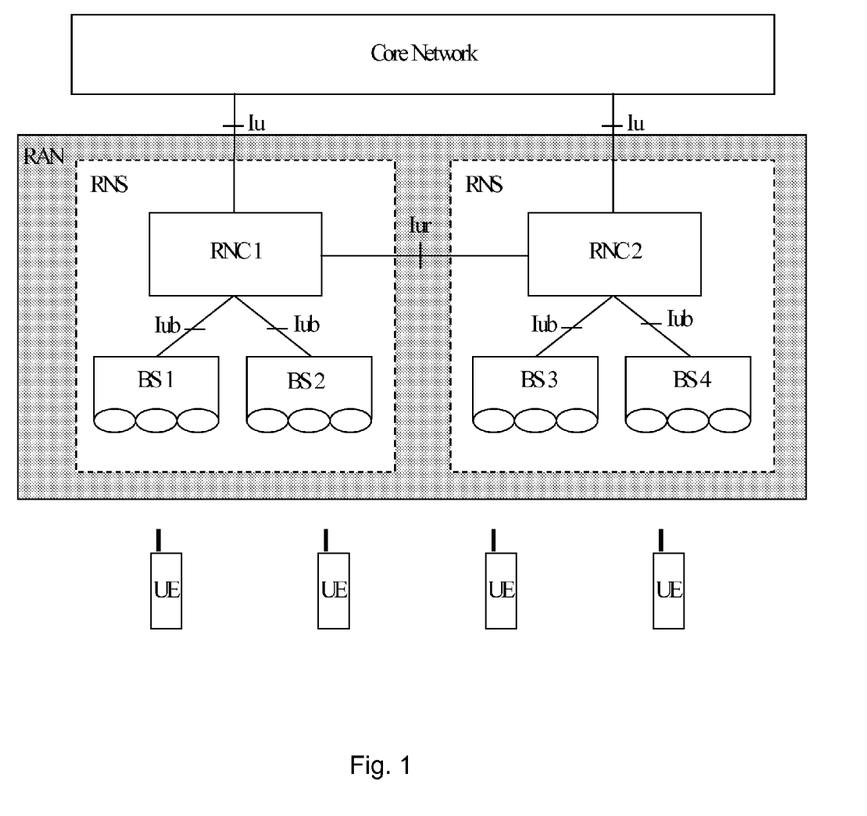
FIG. 1 a general view of a cellular radio system

In FIG. 1 a general view of a cellular radio system is depicted with different nodes and interfaces.

In FIG. 1:

A User Equipment (UE) is the mobile terminal by which a subscriber can access services offered by an operator's Core Network (CN).

A cell covers a geographical area. The radio coverage in a cell is provided by a radio base station equipment at a base station site. Each cell is identified by a unique (at least locally unique) identity, which is broadcast in the cell. There may be more than one cell covering the same geographical area.

The BS (Base Station) handles the radio transmission and reception within one or more cells.

The RAN (Radio Access Network) is the part of the network that is responsible for the radio transmission and control of the radio connection.

The RNS (Radio Network Subsystem) controls a number of Base Stations in the radio access network.

The RNC (Radio Network Controller) controls radio resources and radio connectivity within a set of cells.

A Radio Link is a representation of the communication between a UE and one cell in the Radio Access Network.

Iub/Iur interfaces: Interfaces connecting the different nodes in the RAN. User data is transported on so-called transport bearers on these interfaces. Dependent on the transport network used, these transport bearers are for example mapped to ATM Adaption Layer 2 (AAL2) connections (in case of an Asynchronous Transfer Mode (ATM) based transport network) or User Datagram protocol (UDP) connections (in case of an Internet Protocol (IP) based transport network).

Furthermore, each node in the radio access network is connected to an operation and maintenance system, typically one or several domain manager (DM) nodes. The DM maintains software upgrades of the nodes, configuration management, and fault and performance monitoring.

In order to align the network operation over several domain managers, possibly from different vendors, there is typically a network management system (NMS) mastering the domain manager operation.

Uplink Radio Resource Management (RRM) In the Third Generation Partnership Project (3GPP) release 99, the RNC controls resources and user mobility. Resource control in this framework includes admission control, congestion control, channel switching, which typically includes changing the data rate of a connection. Furthermore, a dedicated connection is carried over a dedicated channel DCH, which is implemented as a DPCCH (Dedicated Physical Control Channel) and a DPDCH (Dedicated Physical Data Channel).

In the evolved third generation (3G) standards, the trend is to decentralize decision making, and in particular the control over the short term data rate of the user connection. The uplink data is then allocated to Evolved DCH (E-DCH), which is implemented as a DPCCH, which is continuous, and an evolved DPCCH (E-DPCCH) for data control and evolved DPDCH (E-DPDCH) for data, and the two latter are only transmitted when there is uplink data to send. Hence the radio base station Node B uplink scheduler determines which transport formats each user equipment can use over E-DPDCH. The RNC is however still responsible for admission control.

A UE in idle state monitors the system information of a base station within range to inform itself about candidate base stations in the service area etc. When a UE needs access to services, it sends a request over a random access channel (RACH) to an RNC via a suitable base station, typically the one with the most favorable radio conditions. Since the uplink propagation is only approximately known, the UE gradually increases the transmission power until either the message has been acknowledged, or the maximum number of attempts has been reached, see Radio Resource Control, 3GPP TS 25.331. After admission control, the RNC initiates a connection via a base station if there are available resources. Uplink coverage is thus a necessity in order to successfully complete random access.

In the uplink for a Wideband Code Division Multiple Access (WCDMA) system, there is a trade-off between coverage and enabled peak rates. This is even more emphasized with enhanced uplink, which supports higher bit rates than traditional dedicated channels. The uplink resources are limited by the rise over thermal (RoT) that the cell can tolerate, where the RoT is defined as the total received power divided by the thermal noise power. A limited RoT is either motivated by coverage requirements or power control stability requirements. When only one user is connected in the cell, both power control stability and coverage are minor issues, since the uplink interference is likely to be dominated by the power generated by this user. In such a case it is tempting to allow a high RoT in order to allow a high signal to interference ratio Ec/Io, which enables the use of high uplink bit rates. Conversely, in order to use the high uplink bit rates, the user connections have to provide high Ec/Io, which implies high RoT.

Denote the UE power level in linear scale by p, the maximum power level by $p_{max}$, the power gain between the UE and base station by g, the total received power at the base station by I, the thermal noise by N, the signal to interference and noise ratio (SINR) by $\gamma$, the required signal to interference and noise ratio by $\gamma_{rec}$, the non-orthogonal fraction of the interference power contribution by the UE (i.e. the interference contribution fraction that the receiver is sensitive to, or unable to suppress by its receiver means) by $\alpha$, Then some expressions relevant for the UTRAN uplink situation includes Rise over Thermal:

$$RoT = \frac{I}{N}$$

UE Signal to Interference plus Noise Ratio (SINR):

$$\gamma = \frac{E_c}{I_o} = \frac{pg}{I - (1-\alpha)pg} \geq \gamma_{rec}$$

Corresponding UE power:

$$p = \frac{I}{g} \frac{\gamma}{1 + (1-\alpha)\gamma} = N \frac{RoT}{g} \frac{\gamma}{1 + (1-\alpha)\gamma}$$

Required UE power to meet service requirements:

$$p_{max} \geq p = N \frac{RoT}{g} \frac{\gamma_{rec}}{1+(1-\alpha)\gamma_{rec}}$$

This means that if the RoT operation point is too high, some UEs will be unable to meet the quality requirements in terms of $\gamma_{rec}$ due to insufficient power.

Today, the RoT limitation is typically set to a system-wide value corresponding to an expected worst power gain g in a cell, and a supported quality level $\gamma_{rec}$. Potentially, some cells with worse power gains than expected will therefore correspond to insufficient service coverage. Moreover, some other cells with better worse power gains than expected operate at a lower RoT than needed, which gives under-utilization of the radio resources since UEs could send with higher power, resulting in higher Ec/Io, and consequently higher bit rates.

Hence there exist a need for new methods and devices providing improved performance in cellular radio systems.

SUMMARY

It is an object of the present invention to provide an improved methods and devices to address the problems as outlined above.

This object and others are obtained by the methods and devices as set out in the appended claims.

Hence, methods and devices to dynamically determine suitable cell-specific RoT limits are provided. The suitable cell-specific RoT limits can advantageously be set both with respect to a short time scale and a long time scale In accordance with some embodiments the long term time scale operation is based on UE measurements representative for the intended coverage area of the cell. In accordance with some embodiments the short term time scale operation is based on UE measurements from active User Equipments only. Furthermore, also receiver capabilities of and cell isolation to neighboring base stations can be considered in the long time scale operation.

In accordance with one embodiment a method in a node of a cellular radio system for setting a Raise over Thermal, RoT, limit for a cell of the cellular radio system is provided. In accordance with the method measurements are obtained from a number of user equipments within the cell collected during a first time period. The RoT limit is then set dynamically within a range determined based on the obtained measurements.

In accordance with one embodiment measurements are obtained from a number of active user equipments within the cell during a second time period, which is typically shorter than the first time period and the RoT limit is set within the range based on the obtained measurements from the active user equipments. The range can set within the node or can be received from another node of the cellular radio system.

In accordance with one embodiment the RoT limit is increased when measurements from the active user equipments indicate that there is a coverage margin when considering current user equipments, and/or decreased when measurements from the active user equipments indicate that there is no or a negative coverage margin when considering current user equipments.

In accordance with one embodiment the RoT limit is increased when no measurement report indicating that a user equipment is operating at a maximum power is received, and/or decreased for each reception of a measurement report indicating that a user equipment is operating at a maximum power.

In accordance with one the measurements from a number of active user equipments comprise at least one of: user equipment power level reports, user equipment power headroom, indications from the user equipment that it has reached it maximum power, happy bit indications.

In accordance with one embodiment another network node, in particular an operation and maintenance node, is informed of the dynamically set RoT limit for the cell.

The invention also extends to a node in a cellular radio system such as a radio base station Node B or a central node, in particular an RNC, adapted to perform the above methods. The node can be provided with a controller/controller circuitry for performing the above methods. The controller(s) can be implemented using suitable hardware and or software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor or may include, without limitation, digital signal processor (DSP) hardware, ASIC hardware, read only memory (ROM), random access memory (RAM), and/or other storage media.

BRIEF DESCRIPTION OF THE DRAWINGS

The present invention will now be described in more detail by way of non-limiting examples and with reference to the accompanying drawing, in which.

DETAILED DESCRIPTION

Figure 2:
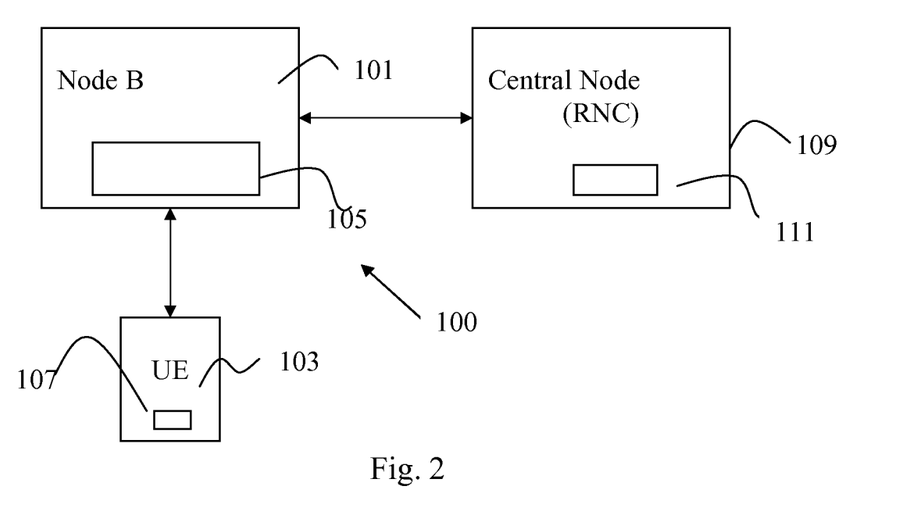
FIG. 2 is a view of a cellular radio system.

In FIG. 2 a general view of a cellular radio system 100 is depicted. The system 100 depicted in FIG. 1 is a UTRAN system. However it is also envisaged that the system can be another similar system. The system 100 comprises a number of base stations 101, whereof only one is shown for reasons of simplicity. The base station 101 can be connected to by user equipments in the figure represented by the UE 103 located in the area served by the base station 101. Further, the base stations 101 are controlled by a central node such as a Radio Network Controller (RNC) in the case of an UTRAN system. The base station, the central node and the user equipment further comprise controllers/controller circuitry 105, 107 and 111 for providing functionality associated with the respective entities. The controllers 105, 107 and 111 can for example comprise suitable hardware and or software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor may include, without limitation, digital signal processor (DSP) hardware, ASIC hardware, read only memory (ROM), random access memory (RAM), and/or other storage media.

A node within the system 100 can be responsible for dynamically setting an RoT limit for an individual cell. The responsible node can typically be a radio base station NodeB 101 or a central Node 109 or any other suitable Node such as a an Operation and Maintenance Node. In accordance with some embodiments the dynamically set RoT value is set within a range determined form long term measurements obtained from user equipments within the cell.

Settings Based on Long-Term Measurements

In traditional link budget work, interference levels, desired service levels and receiver sensitivities are known, and the task is to find the highest power gain that meets the requirements. Here, the task is the reverted—given desired service levels, receiver sensitivities and estimated power gain information, the task is to find the highest acceptable interference level (relative the thermal noise level—RoT).

The uplink power gain information, typically estimates of the power gain distribution over the service area, can be acquired in a number of different ways, i.e. via a combination of:

Planning tool propagation predictions, possible tuned using real measurement

Figure 3:
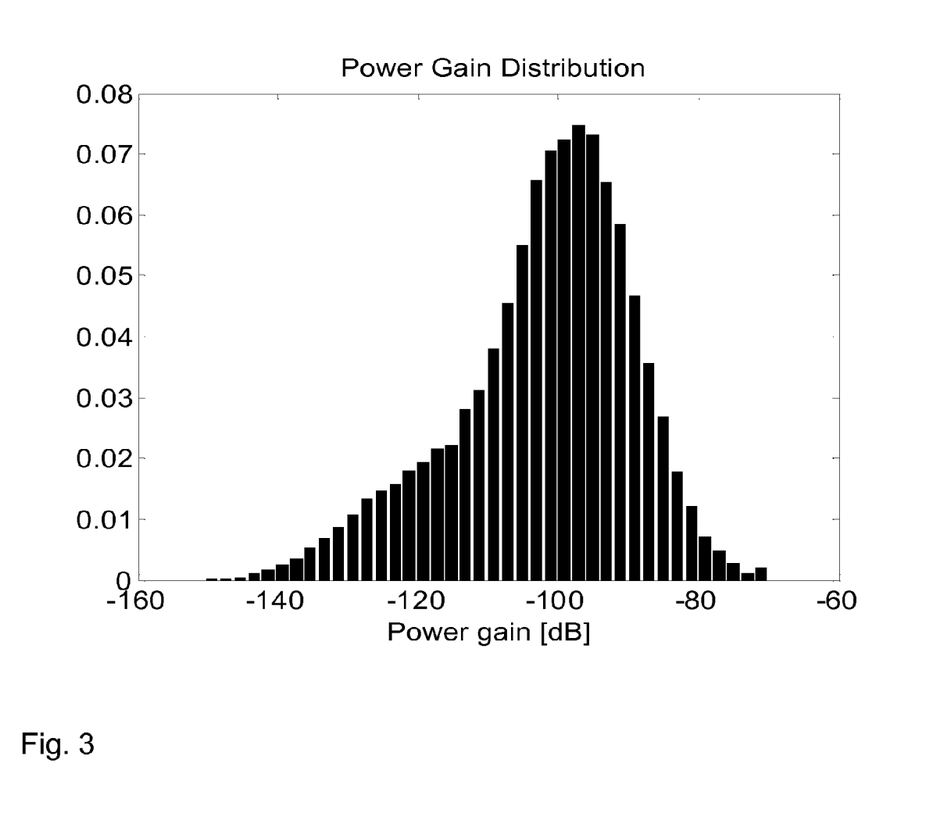
FIG. 3 is an example of uplink power gain statistics as a distribution.
Figure 4:
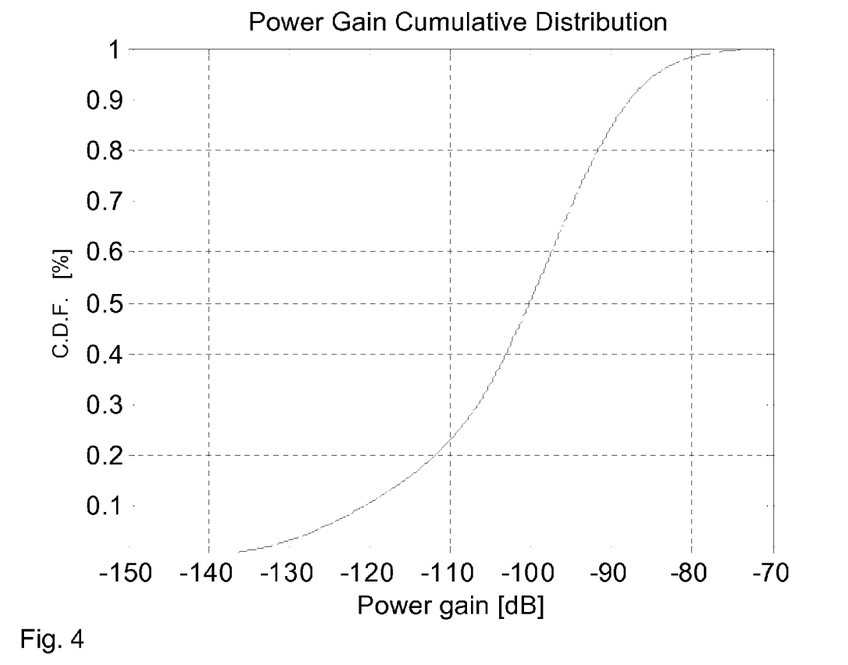
FIG. 4 is an example of uplink power gain statistics as a cumulative distribution function and FIG. 5 is a flow chart depicting different steps performed when setting the RoT limit in a cell.

Downlink power gain measurements associated per cell, and converted to reflect the uplink power gain (using knowledge about uplink and downlink offsets, e.g. due to uplink amplifiers). The power gain estimates can be based on downlink pilot measurements and using known pilot power levels. The gathering can be via Drive tests UE measurement reporting in association with random access Periodic UE measurements of any UE FIG. 3 and FIG. 4 illustrate estimated power gain information. From this information, it is possible to determine a power gain percentile, e.g. 99-percentile, which corresponds to a desired coverage probability, e.g. 99%. This leads to a limiting power gain $g_{perc}$.

Based on this statistics, intended service quality in Signal to Interference and Noise Ratio (SINR), receiver performance and information about maximal UE power level it is possible to derive a RoT limit for full service coverage in the cell:

$$RoT \leq RoT_{limit} = \frac{p_{max} g_{perc}}{N} \frac{1 + (1-\alpha)\gamma_{rec}}{\gamma_{rec}}$$

It is also possible to gather power gain information considering neighbor cells and use the same reasoning to address the maximum interference contribution that is allowed to be induced in the neighboring cell.

The longer time scale power gain information can be aggregated per cell in different nodes. In accordance with some embodiments, the power gain information is aggregated in the domain manager, or in data bases in association to the domain manager. In alternative embodiments, the power gains are aggregated in the RNC, the Node B, the network management system, or in data bases associated with any of the listed nodes.

Settings Based on Short Term Measurements

On a short time scale, it is not likely that full service coverage is needed. Instead, it is the current user locations and power gain values that determine the short time RoT limits. Therefore, on the short time scale, the RoT limit is adjusted based on measurements from currently active UEs. Examples of such measurements include:

UE power level reports

UE reports of power level relative its maximum power level (power headroom)

UE reports indicating that the UE has reached its maximum power level—event 6d in 3GPP RRC, see Radio Resource Control, 3GPP TS 25.331.

Happy bit indications

In one embodiment, the RoT limit is adjusted based on the UE measurements, where RoT limit is increased if UE reports indicate that there is a coverage margin considering current UEs, and/or it is decreased if the is no or a negative coverage margin.

In another embodiment, the RoT limit is increased when no measurement reports indicate that a UE is operating at a maximum power is received, and/or the RoT limit is decreased for each reception of such a report.

In yet another embodiment, the RoT limit is changed based on observations during a time windows, wherein the RoT limit is increased if no measurement reports indicating that the UE is operating at maximum power are received during the time window, and/or the RoT limit is decreased if at least one such a report is received during the time window.

The shorter time scale power gain information can be processed per cell in different nodes. In accordance with some embodiments, the power gain information is processed in the NodeB or the RNC. These nodes then determine the short term RoT limit. The adjustments can be bounded from below by the RoT limit from the long time scale operations.

Furthermore, the adjustments can be bounded from above by the RoT limit from the long time scale operations plus an offset RoT_window. In such an embodiment short term adjustments of the RoT limit will be bounded within an RoT range, and the bounds are cell specific.

In one embodiment, the RoT limits (upper bound limit and/or lower bound limit) are signaled from the longer time scale aggregation node to the shorter time processing node.

Figure 5:
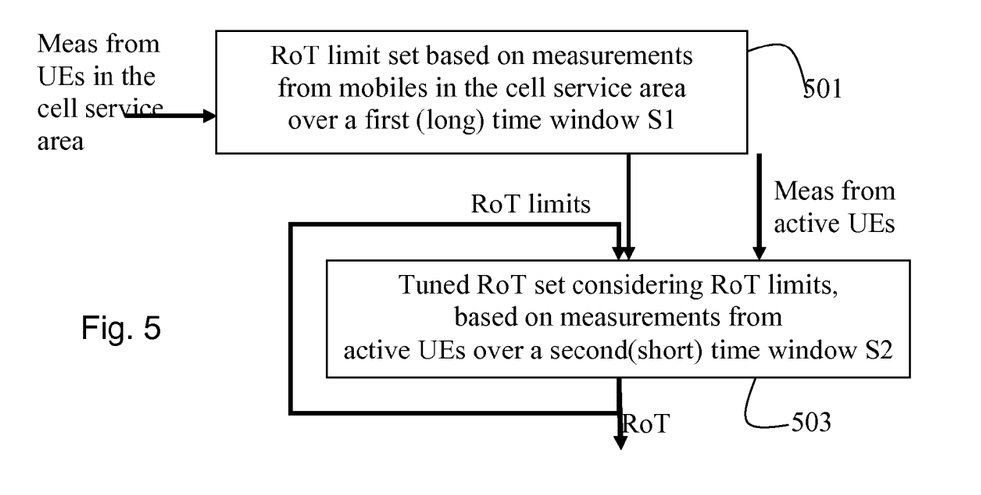

In FIG. 5 some procedural steps performed when setting an RoT limit for a cell is depicted. The different steps can be performed in different nodes of a cellular radio system and not all of the procedural steps need to be performed to gain the advantages enabled by dynamically setting a RoT limit based on measurements from user equipments.

First, in a step 501, the RoT limit for a cell is dynamically set within a range determined based on the obtained measurements. The measurements are the result of a long-term measurement time S1. Typically the measurements are obtained over a time period providing sufficient information. The required time typically depends on the cell coverage area and the traffic, and some examples include weekly and daily time windows. The result of the RoT limit set in step 501 is in some embodiments a value that can be used as the RoT limit for the cell. The RoT limit is dynamically updated based on the long term-measurements in some embodiments the result is a RoT limit or an allowed range for the RoT. The result from step 501 can be further tuned on a short-time scale based on short-term measurements time S2. Typically the short term measurements are obtained over a time period of seconds or sub-seconds. This objective is to take the currently active mobiles into consideration. Thus, S1>S2. The further tuning is performed in a step 503. It is to be noted that the steps 501 and 503 can take place in different nodes of a system 100. In step 503 the RoT limit is tuned considering RoT limit(s) set in step 501. For example if the input from step 501 is a range with lower and upper bounds as described above, the RoT limit is in step 503 tuned within this range. In another exemplary embodiments if the input from step 501 is a single value the RoT limit is in step 503 tuned within a range including the RoT limit set in step 501. The tuning in step 503 is based on measurements from some or all of the UEs that are active in the cell.

In accordance with some embodiments described herein the dynamic setting of RoT for a cell means that the situation of the active UEs only can be considered, while operating within a reasonable RoT range adapted to the intended service coverage area of the cell. This means that higher data rates can be used where possible without significantly jeopardizing the service coverage, which is a major advantage that will improve the overall performance of the cellular radio system.

The invention claimed is:

1. A method in a node of a cellular radio system of setting a Rise over Thermal (RoT) limit for a cell of the cellular radio system, the method comprising:
    obtaining a plurality of measurements from a number of user equipment's within the cell collected during a long time period and a short time period, the long time period being used for obtaining the plurality of measurements associated with the number of user equipment's in a coverage area of the cell, the short time period being used for obtaining the plurality of measurements associated with active user equipment's within the cell; and
    dynamically setting the RoT limit within a range, wherein the range is determined based on the obtained plurality of measurements collected during the long time period and the short time period.

2. The method of claim 1, further comprising:
    increasing the RoT limit when the plurality of measurements from the active user equipment's indicate that there is a coverage margin when considering current user equipment's, or decreasing the RoT limit when the plurality of measurements from the active user equipment's indicate that there is no or a negative coverage margin when considering current user equipment's.

3. The method of claim 1, further comprising:
    increasing the RoT limit when no measurement report indicating that a user equipment is operating at a maximum power is received, or decreasing the RoT limit for each reception of a measurement report indicating that a user equipment is operating at a maximum power.

4. The method of claim 1, wherein the plurality of measurements from the number of active user equipment's comprise at least one of: user equipment power level reports, user equipment power headroom, indications from the user equipment that it has reached a maximum power, happy bit indications.

5. The method of claim 1, further comprising informing another network node of the dynamically set RoT limit for the cell.

6. The method of claim 5, wherein said another network node is an operation and maintenance node.

7. A method in a node of a cellular radio system for setting a Rise over Thermal (RoT) limit for a cell of the cellular radio system, the method comprising:
    obtaining a plurality of measurements from a number of user equipment's within the cell during a long time period and a short time period, the long time period being used for obtaining the plurality of measurements associated with the number of user equipment's in a coverage area of the cell, the short time period being used for obtaining the plurality of measurements associated with active user equipment's within the cell; and
    dynamically setting the RoT limit within a range, wherein dynamically setting the RoT limit comprises dynamically setting the RoT limit based on the obtained plurality of measurements collected during the long time period and the short time period, and wherein said range is received from another node of the cellular radio system.

8. A node in a cellular radio system adapted to set a Rise over Thermal (RoT) limit for a cell of the cellular radio system, the node comprising:
    a controller circuitry adapted to obtain a plurality of measurements from a number of user equipment's within the cell during a long time period and a short time period, the long time period being used for obtaining the plurality of measurements associated with the number of user equipment's in a coverage area of the cell, the short time period being used for obtaining the plurality of measurements associated with active user equipment's within the cell; and
    the controller circuitry adapted to dynamically set the RoT limit within a range, wherein the range is determined based on the obtained plurality of measurements collected during the long time period and the short time period.

9. The node of claim 8, further comprising:
    the controller circuitry adapted to increase the RoT limit when the plurality of measurements from the active user equipment's indicate that there is a coverage margin when considering current user equipment's, and to decrease the RoT limit when the plurality of measurements from the active user equipment's indicate that there is no or a negative coverage margin when considering current user equipment's.

10. The node of claim 8, further comprising:
    the controller circuitry adapted to increase the RoT limit when no measurement report indicating that a user equipment is operating at a maximum power is received, and to decrease the target RoT for each reception of a measurement report indicating that a user equipment is operating at a maximum power.

11. The node of claim 8, wherein said measurements from the number of active user equipment's comprise at least one of: user equipment power level reports, user equipment power headroom, indications from the user equipment that it has reached a maximum power, happy bit indications.

12. The node of claim 8, further comprising controller circuitry adapted to inform another network node of the dynamically set RoT limit for the cell.

13. The node of claim 12, wherein said another network node is an operation and maintenance node.

14. The node of claim 8, wherein the node is a radio base station or a central node.

15. A node in a cellular radio system adapted to set a Rise over Thermal (RoT) limit for a cell of the cellular radio system, the node comprising:
    a controller circuitry adapted to obtain a plurality of measurements from a number of user equipment's within the cell during a long time period and a short time period, the long time period being used for obtaining the plurality of measurements associated with the number of user equipment's in a coverage area of the cell, the short time period being used for obtaining the plurality of measurements associated with active user equipment's within the cell; and
    the controller circuitry adapted to dynamically set the RoT limit within a range, wherein the controller circuitry is adapted to dynamically set the RoT limit based on the obtained plurality of measurements collected during the long time period and the short time period, and wherein said range is received from another node of the cellular radio system.

* * * * *